United States Patent [19]
Singleton

[11] Patent Number: 6,079,837
[45] Date of Patent: Jun. 27, 2000

[54] METHOD AND APPARATUS FOR PROVIDING A MIRROR FOR ASSISTING IN THE HITCHING OF A TRAILER TO A TOWING VEHICLE

[76] Inventor: Ricky Lee Singleton, 307 W. Dorris, Eldorado, Tex. 76936

[21] Appl. No.: 09/396,963

[22] Filed: Sep. 16, 1999

[51] Int. Cl.⁷ .................................................. G02B 7/182
[52] U.S. Cl. .................. 359/872; 359/871; 359/841; 359/842; 359/843; 359/844; 248/476
[58] Field of Search ..................... 359/872, 871, 359/841, 842, 843, 844; 248/476, 477, 489

[56] References Cited

U.S. PATENT DOCUMENTS

| | | | |
|---|---|---|---|
| D. 340,219 | 10/1993 | Moon | D12/187 |
| 3,485,555 | 12/1969 | Morris | 359/872 |
| 3,767,292 | 10/1973 | Rutkowski | 359/872 |
| 4,905,376 | 3/1990 | Neely | 33/264 |
| 4,925,287 | 5/1990 | Lord et al. | 248/467 |
| 4,951,913 | 8/1990 | Quesada | 248/485 |
| 5,111,342 | 5/1992 | Quesada | 359/872 |
| 5,180,182 | 1/1993 | Haworth | 359/872 |
| 5,235,468 | 8/1993 | Stephens | 359/841 |
| 5,309,289 | 5/1994 | Johnson | 359/871 |
| 5,313,337 | 5/1994 | Byers | 359/872 |
| 5,478,101 | 12/1995 | Roberson | 280/477 |
| 5,482,310 | 1/1996 | Staggs | 359/881 |
| 5,550,681 | 8/1996 | Mazarac | 359/872 |
| 5,657,175 | 8/1997 | Brewington | 359/872 |
| 5,669,621 | 9/1997 | Lockwood | 280/477 |
| 5,784,213 | 7/1998 | Howard | 359/872 |
| 5,825,564 | 10/1998 | Mazarac | 359/872 |

*Primary Examiner*—Cassandra Spyrou
*Assistant Examiner*—Mohammad Y. Sikder
*Attorney, Agent, or Firm*—Royston, Rayzor, Vickery, Novak & Druce, L.L.P.

[57] ABSTRACT

A new visibility aid for providing a mirror for assisting in the hitching of a trailer to a towing vehicle and method of use have been developed. The visibility aid comprises a mounting portion adapted to be fit to a receiving portion of a towing vehicle and an extension coupled to the mounting portion. Attached to the extension is a reflective member. The mounting portion is constructed of a bendable member arranged for being configured by the user for a custom fit to the towing vehicle. The visibility aid is also uniquely designed to be adapted by the user to form a custom fit with various types of towing vehicle. The mounting portion is coated with a buffering material to avoid scratch damage to the receiving portion of the towing vehicle.

7 Claims, 3 Drawing Sheets

METHOD AND APPARATUS FOR PROVIDING A MIRROR FOR ASSISTING IN THE HITCHING OF A TRAILER TO A TOWING VEHICLE

DESCRIPTION

1. Technical Field

The present invention relates generally to accessories for towing vehicles and trailers, and more specifically, to an improved apparatus for providing a mirror for assisting in the hitching of a trailer to a towing vehicle.

2. Background Art

When positioning a towing vehicle so as to attach it to a towable trailer, it is difficult for an unassisted driver to maneuver a towing vehicle into position so that the hitch mount attached to a towing vehicle aligns with the hitch connection of a towable trailer. Unassisted drivers must frequently exit their vehicles to evaluate further maneuvering required to achieve the alignment and connection of the hitch mount of the towing vehicle with the hitch connection of the towable trailer. Several mirror type devices have been designed in an attempt to provide the towing vehicle driver with a view of the hitch mount and the hitch connection. Known examples of these devices, however, are awkward to use and many cannot be adapted for use with the numerous types of towing vehicles. Further, known examples of these devices must be repositioned and/or reconfigured prior to each use.

In view of the above described deficiencies associated with the use of known designs for visibility aids for providing a mirror for assisting in the hitching of a trailer to a towing vehicle, the present invention has been developed to alleviate these drawbacks and provide further benefits to the user. These enhancements and benefits are described in greater detail herein below with respect to several alternative embodiments of the present invention.

DISCLOSURE OF THE INVENTION

The present invention in its several disclosed embodiments alleviates the drawbacks described above with respect to conventionally designed visibility aids and incorporates several additional beneficial features. The visibility aid utilizes a bendable resilient metal with memory characteristics in the construction of the mounting portion of the visibility aids. This allows the user to adjust the visibility aid so that it can be adapted for use on any type of towing vehicle. Further, once adjusted by the user, the memory characteristics of the metal allow the visibility aid to return to a set configuration after being elastically deformed, thus not requiring the user to reposition and/or reconfigure the visibility aid prior to each use.

The present invention is directed to a new visibility aid for assisting a driver in aligning a hitch mount of a towing vehicle with a hitch connection of a towable trailer. In the preferred embodiment, the visibility aid comprises a mounting portion adapted to be fit to a receiving portion of the towing vehicle upon which the visibility aid is to be mounted. The mounting portion comprises a bendable member arranged for being user-configured into a custom fit for matingly engaging the mounting portion in a friction fit about the receiving portion of the towing vehicle. An extension is coupled to the mounting portion at a mounting end and the extension has a reflective member coupled proximate to a distal end of the extension opposite the mounting portion. It is an object of the present invention that the bendable member is constructed from bendable resilient metal having a memory characteristic for returning to a set configuration after being elastically deformed therefrom. It is another object of the invention that the extension is constructed at least partially from bendable material thereby facilitating an adjustable user-configurable relative arrangement between the mounting portion and the reflective member.

The present invention may also comprise an elongate portion having a mid-section and terminating in an L-shaped bend at the distal end. The bendable member is fixed to the elongate portion at the mid-section thereof. This embodiment may also comprise a cross member releasably connected to the extension at the L-shaped bend at the distal end of the elongate portion. The cross member is adapted to be coupled to the reflective member.

This embodiment may also comprise at least two extensions. Each of the extensions is coupled to the mounting portion at a mounting end thereof. The cross member is releasably connected between at least two extensions at the couplings. Each of the couplings is located at two opposite ends of the cross member. In one alternative embodiment, each of the couplings comprises a nut and bolt connection. In another alternative embodiment, the cross member comprises an aperture extending through a mid-section thereof. The aperture is configured for releasably coupling the reflective member to the cross member.

The reflective member may have a receiving socket located at a back side thereof for receiving the ball of the extension pin therein. The reflective member may also include an extension pin adapted to be releasably secured in the aperture at a securable end of the extension pin. The extension pin terminates at a distal end thereof in a ball for insertion in the receiving socket located at the back side of the reflective member.

In an alternative embodiment of the present invention, the reflective member comprises a convex mirrored surface. In another alternative embodiment, at least part of the mounting portion is coated in a buffering material for avoiding scratch damage to the receiving portion of the towing vehicle upon which the visibility aid is to be mounted. The buffering material may be a dip-coat of rubber.

Another aspect of the present invention is a method for providing a visibility aid for assisting a driver in aligning a hitch mount of a towing vehicle with a hitch connection of a towable trailer. The method comprises providing a visibility aid arrangement having a mounting portion adapted to be custom fit to a receiving portion of a towing vehicle upon which the visibility aid is to be mounted. The mounting portion comprises a bendable member, arranged for being user-configured into a custom fit for matingly engaging the mounting portion in a friction fit about the receiving portion of the towing vehicle, and an extension coupled to the mounting portion at a mounting end. The extension has a reflective member coupled proximate to a distal end of the extension opposite the mounting portion.

A preferred method for providing a visibility aid comprises bending the bendable member to form a receiving space in the mounting portion. The receiving space is configured to be slightly more narrow than the receiving portion of the towing vehicle upon which the visibility aid is to be mounted so that a pinch-fit is accommodated between the mounting portion and the receiving portion of the towing vehicle when the visibility aid is mounted thereupon. This method for providing a visibility aid further comprises constructing the bendable member from bendable resilient metal having a memory characteristic for returning to a set configuration after being elastically deformed therefrom.

The preferred method also comprises constructing the extension at least partially from bendable material thereby facilitating an adjustable user-configurable relative arrangement between the mounting portion and the reflective member and bending the extension into a custom configuration tailored to a particular orientation between a towing vehicle and a hitch receiver mounted thereto. An additional alternative embodiment of the visibility aid comprises an elongate portion having a mid-section and terminating in an L-shaped bend at the distal end. The bendable member is fixed to the elongate portion at the mid-section thereof.

This embodiment further comprises releasably connecting a cross member to the extension at the L-shaped bend at the distal end of the elongate portion. The cross member is adapted to be coupled to the reflective member. An alternative embodiment may also further comprise at least two extensions, where each of the extensions is coupled to the mounting portion at a mounting end thereof, and a cross member which is releasably connected between at least two extensions at the couplings. Each of the couplings is located at two opposite ends of the cross member. A reflective member has a receiving socket located at a back side thereof for receiving the ball of the extension pin therein. An extension pin is adapted to be releasably secured in the aperture at a securable end of the extension pin. The extension pin terminates at a distal end thereof in a ball for insertion in the receiving socket located at the back side of the reflective member.

The beneficial effects described above apply generally to the exemplary devices and mechanisms disclosed herein of the visibility aid. The specific structures through which these benefits are delivered will be described in detail herein below.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale. Some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
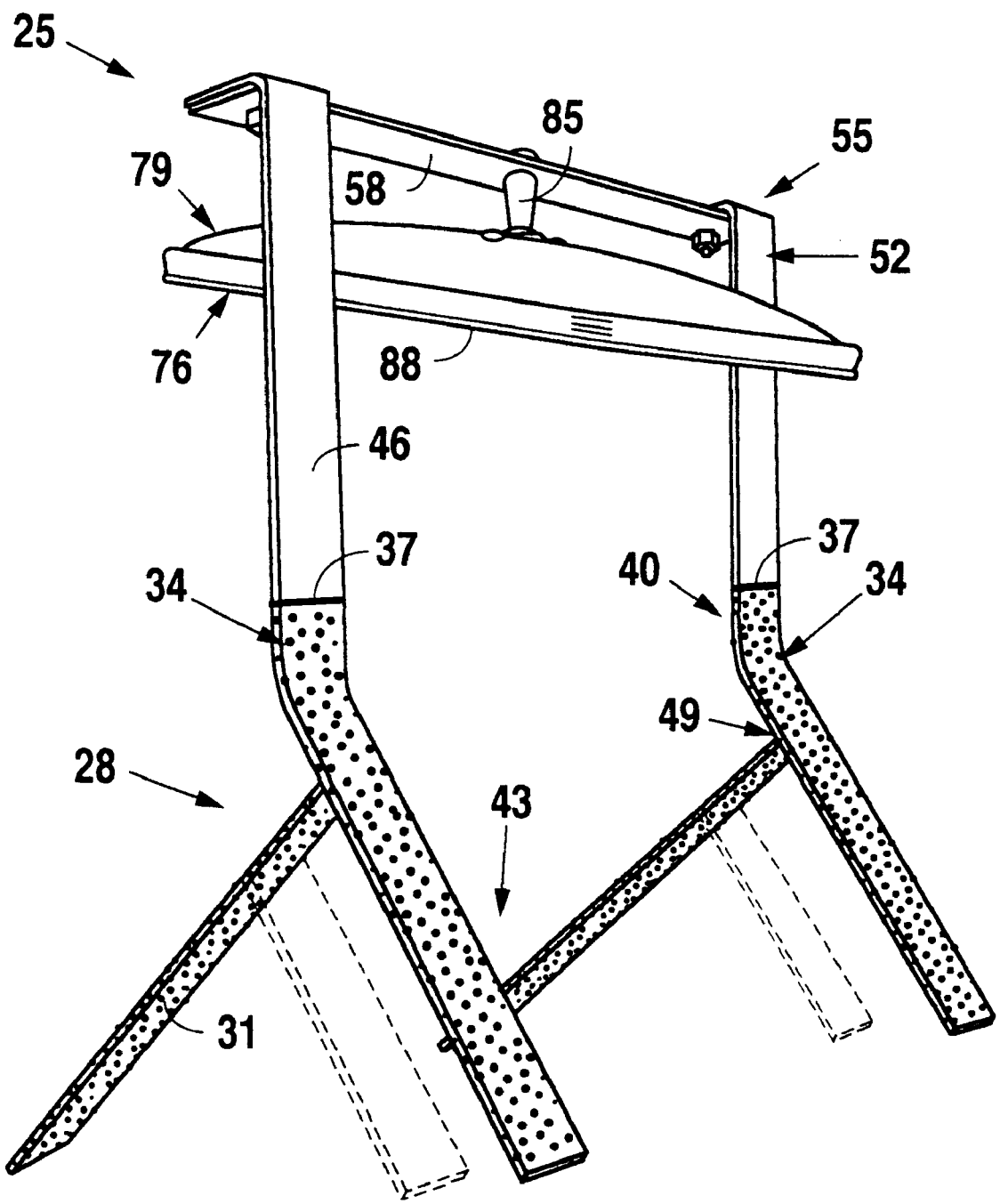
FIG. 1 is a PERSPECTIVE back view of the visibility aid prior to being configured into a custom fit by the user.

Referring to the drawings, FIG. 1 is a perspective back view of a preferred embodiment of the visibility aid 25 of the present invention. In the preferred embodiment of the invention, the visibility aid 25 comprises a mounting portion 28 and an extension 40. The extension 40 is coupled to the mounting portion 28 at a mounting end 43. The extension 40 has a reflective member 76 coupled proximate to a distal end 52 of the extension opposite to the mounting portion 28.

The mounting portion 28 comprises a bendable member 31 capable of being configured by the user into a custom fit for matingly engaging the mounting portion 28 in a friction fit about the receiving portion 16 of the towing vehicle 10. The mounting portion 28 may be coated in a buffering material 34 for avoiding scratch damage to the receiving portion 16 of the towing vehicle 10 upon which the visibility aid 25 is to be mounted. In a preferred embodiment, the buffering material 34 is a dip-coat of rubber 37. The bendable member 31 is constructed from a bendable resilient metal having a memory characteristic for returning to a set configuration after being elastically deformed therefrom.

The visibility aid 25 also comprises an elongated portion 46 having a mid-section 49 and terminating in an L-shaped bend 55 at the distal end 52. A cross member 58 is releasably connected to the extension 40 at the L-shaped bend 55. The cross member 58 is adapted to be coupled to the reflective member 76. In the embodiment shown in FIG. 1, the visibility aid 25 comprises two extensions 40. As also shown in FIG. 1, the reflective member 76 is a convex mirror surface 88.

Figure 2:
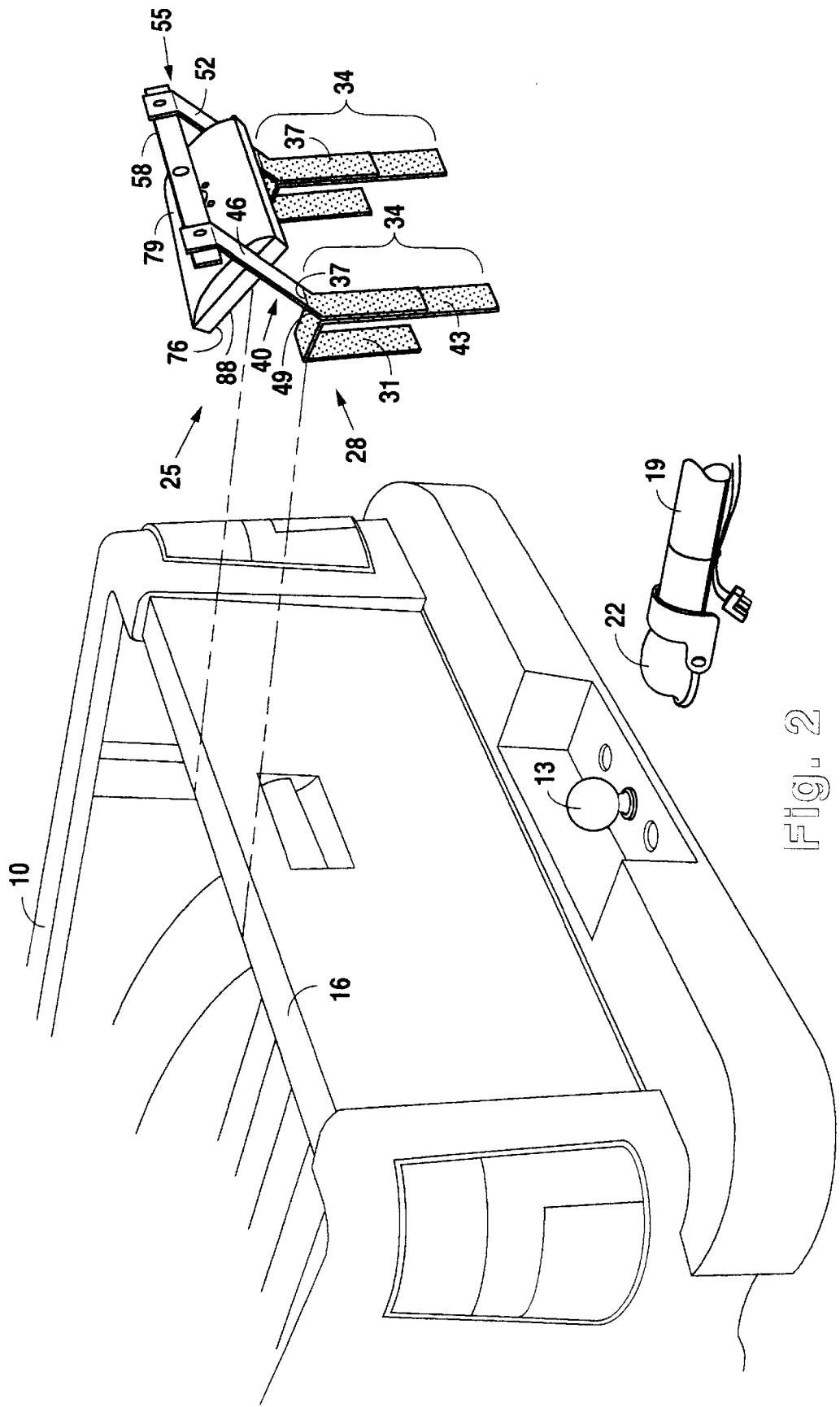
FIG. 2 is a PERSPECTIVE view of the visibility aid having been configured into a custom fit and ready to be installed on a receiving portion of a towing vehicle.

In FIG. 2, the bendable member 31 has been configured by the user to form a custom fit for matingly engaging the mounting portion 28 into a friction fit about the receiving portion 16 of the towing vehicle 10. The extension 40 is bent into a custom configuration tailored to a particular orientation between a towing vehicle 10 and the hitch mount 13 so as to allow the user a clear view of the hitch mount 13, hitch connection 22, and towable trailer 19 when the visibility aid 25 is mounted to the receiving portion 16 of the towing vehicle 10.

Figure 3:
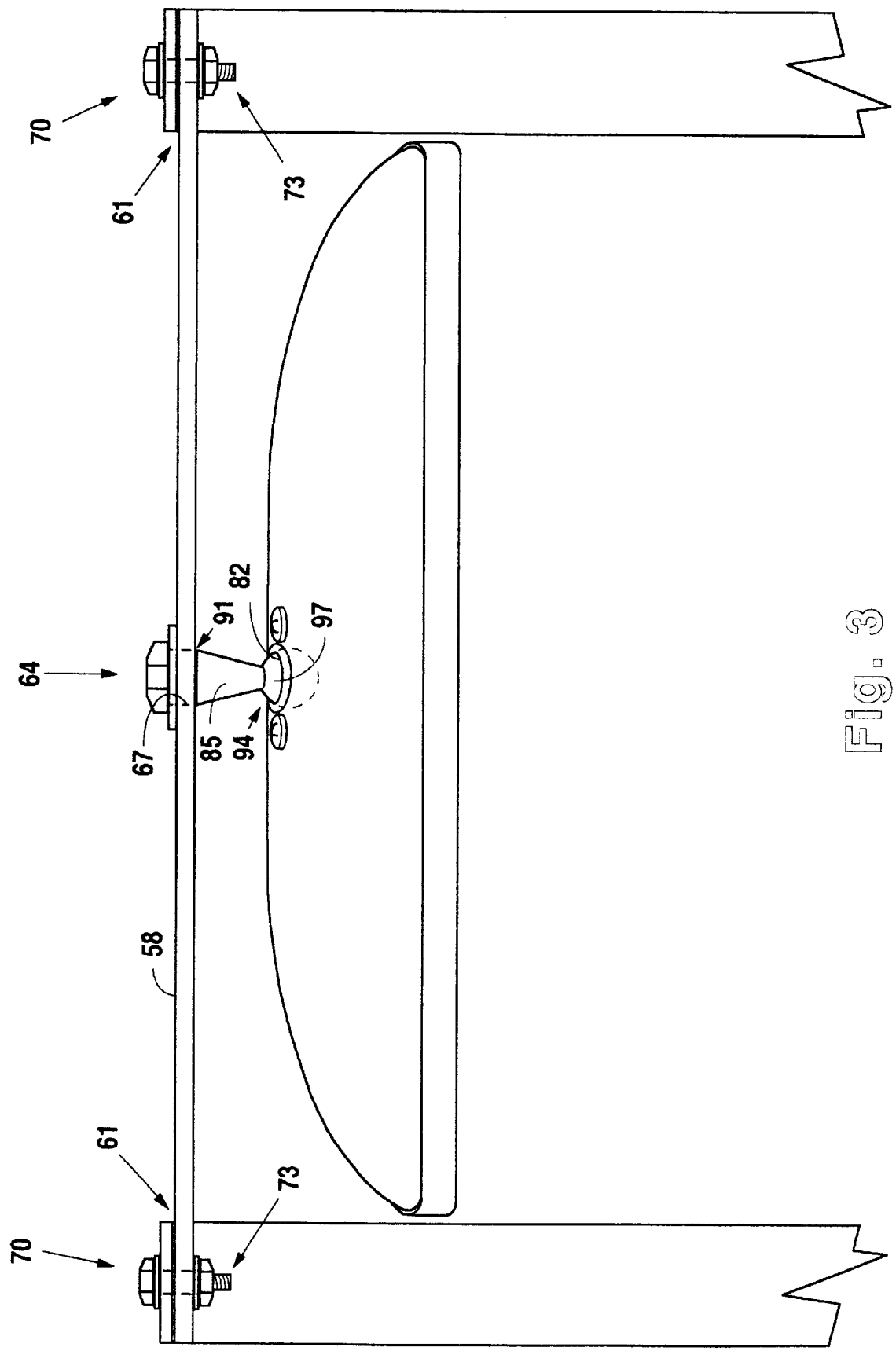
FIG. 3 is a PARTIAL elevational back view of the visibility aid.

FIG. 3 is a partial elevational back view of the visibility aid. The cross member 58 is releasably connected between the two extensions 40 at couplings 70. Each of the couplings 70 is located at two opposite ends 61 of said cross member 58. In the embodiment shown in FIG. 3, the couplings 70 comprise a nut and bolt connection 73. The cross member 58 comprises an aperture 67 extending through the mid-section 64 thereof. The aperture 67 is configured for releasably coupling the reflective member 76 to the cross member 58. The reflective member 76 has a receiving socket 82 located at the back side 79 thereof. An extension pin 85 is adapted to be releasably secured in the aperture 67 at a securable end 91 of the extension in 85. The extension pin 85 terminates at the distal end 94 thereof in a ball 97 for insertion in the receiving socket 82 located at the back side 79 of the reflective member 76.

A visibility aid and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the transportation, recreation, agriculture and other related industries involving the use of towing vehicles and trailers.

What is claimed and desired to be secured by Letters Patent is as follows:

1. A method for providing a visibility aid for assisting a driver in aligning a hitch element of a towing vehicle with a hitch connection of a towable trailer, said method comprising steps of:

providing a visibility aid arrangement having a mounting portion for custom fit to a receiving portion of a towing vehicle upon which said visibility aid is to be mounted, said mounting portion comprising a bendable member arranged for being user-configured into a custom fit for matingly engaging said mounting portion in a friction fit about the receiving portion of the towing vehicle; and an extension coupled to said mounting portion at a mounting end, said extension having a reflective member coupled proximate a distal end of said extension opposite said mounting portion;

bending said bendable member to form a receiving space in said mounting portion, said receiving space being configured to be slightly narrower than the receiving portion of the towing vehicle upon which said visibility aid is to be mounted so that a pinch-fit is accommodated between said mounting portion and the receiving portion of the towing vehicle when said visibility aid is mounted thereupon.

2. The method for providing a visibility aid as recited in claim 1, further comprising:

constructing said bendable member from bendable resilient metal having a memory characteristic for returning to a set configuration after being elastically deformed therefrom.

3. The method for providing a visibility aid as recited in claim 1 further comprising:

constructing said extension at least partially from bendable material thereby facilitating an adjustable user-configurable relative arrangement between said mounting portion and said reflective member; and bending said extension into a custom configuration tailored to a particular orientation between a towing vehicle and a hitch receiver mounted thereto.

4. The visibility aid as recited in claim 1 wherein said extension further comprises:

an elongate portion having a mid-section and terminating in a L-shaped bend at said distal end; and said bendable member being fixed to said elongate portion at said mid-section thereof.

5. The visibility aid as recited in claim 4, further comprising:

releasably connecting a cross member to said extension at said L-shaped bend at said distal end of said elongate portion, said cross member being adapted to be coupled to said reflective member.

6. The visibility aid as recited in claim 5, further comprising:

at least two extensions, each of said extensions being coupled to said mounting portion at a mounting end thereof; and said cross member being releasably connected between said at least two extensions at couplings, one each of said couplings being located at two opposite ends of said cross member.

7. The visibility aid as recited in claim 5, further comprising:

said reflective member having a receiving socket located at a back side thereof for receiving said ball of said extension pin therein; and an extension pin adapted to be releasably secured in said aperture at a securable end of said extension pin, said extension pin terminating at a distal end thereof in a ball for insertion in said receiving socket located at said back side of said reflective member.

* * * * *